United States Patent

Tsukamoto et al.

[11] Patent Number: 5,803,866
[45] Date of Patent: Sep. 8, 1998

[54] CONTROL SYSTEM FOR AUTOMATIC TRANSMISSION

[75] Inventors: Kazumasa Tsukamoto, Toyota; Masahiro Hayabuchi; Masaaki Nishida, both of Anjo; Yoshihisa Yamamoto; Akitomo Suzuki, both of Nishio, all of Japan

[73] Assignee: Aisin AW Co., Ltd., Japan

[21] Appl. No.: 774,526

[22] Filed: Dec. 30, 1996

[30] Foreign Application Priority Data

Dec. 28, 1995 [JP] Japan .................................. 7-343775

[51] Int. Cl.$^6$ ...................................................... F16H 61/06
[52] U.S. Cl. ................................................................ 477/132
[58] Field of Search ...................................... 477/131, 132

[56] References Cited

U.S. PATENT DOCUMENTS 5,311,795  5/1994  Yoshimura et al. ..................... 477/131

*Primary Examiner*—Dirk Wright
*Attorney, Agent, or Firm*—Lorusso & Loud

[57] ABSTRACT

During transmission shifts, a band brake is used in either a self-loosening direction in which an engaging force thereof is not sensitive to variations in hydraulic pressure or a self-tightening direction in which the engaging force is sensitive to variations in hydraulic pressure. In the self-loosening direction, a second regulated hydraulic pressure generated by a second pressure regulating valve (B-4 control valve) in accordance with a control hydraulic pressure generated by a second (throttle-pressure-control) linear solenoid valve in a margin control region thereof is supplied to a hydraulic servo of the fourth brake (band brake). In this clutch-to-clutch shift, a first regulated hydraulic pressure generated by a first pressure regulating valve (a shift-pressure control valve) in accordance with a control hydraulic pressure generated by a first (pressure-regulation) linear solenoid valve is supplied to a hydraulic servo of a third (UD direct) clutch. In the self tightening direction, the first regulated hydraulic pressure generated by the first pressure regulating valve (the shift-pressure control valve) is supplied to the hydraulic servo of the fourth brake (band brake).

6 Claims, 6 Drawing Sheets

| | C1 | C2 | C3 | B1 | B2 | B3 | B4 | B5 | F1 | F2 | F3 |
|---|---|---|---|---|---|---|---|---|---|---|---|
| 1ST | O | | | | | ◌ | | ◌ | | O | O |
| 2ND | O | | | ◌ | O | | | ◌ | O | | O |
| 3RD | O | | | ◌ | O | | O | | O | | |
| 4TH | O | | O | ◌ | O | | | | O | | |
| 5TH | O | O | O | | | | | | | | |
| 3Low | O | O | | | O | | | ◌ | | | O |
| 4Low | O | O | | | O | | O | | | | |
| REV | | O | | | | | O | O | | | |

◌ : Engine Brake

CONTROL SYSTEM FOR AUTOMATIC TRANSMISSION

BACKGROUND OF THE INVENTION

1. Field of the Invention

In general, the present invention relates to a control system for an automatic transmission which is mounted on a vehicle and changes the transmission ratio by switching torque transmission from one path to another path by engagement and disengagement of a plurality of friction engagement elements. In particular, the present invention relates to a such a control system employing a band brake as a friction engagement element.

2. Description of the Prior Art

A conventional control apparatus for an automatic transmission of a vehicle is disclosed in Japanese published patent application laid-open No. Sho 62-246653. This conventional control apparatus reduces the magnitude of shift shock by changing a torque transmission path from a released friction engagement element to an engaged friction engagement element. This is achieved, responsive to a shift command for releasing one of the friction engagement elements and engaging another, by the hydraulic pressure supplied to the disengaging friction engagement element being controlled so that the rotational speed of an input shaft is changed to a desired rotational speed by a predetermined value greater than the rotational speed prior to the issuance of the shift command. At the same time, as an effective shift is started at the beginning of the engagement of the engaging friction engagement element, the hydraulic pressure supplied to the engaging friction engagement element is controlled so that the rate of change in input-shaft rotational speed is equal to a predetermined target for the rate of change.

In the control of the hydraulic pressures described above, a regulated hydraulic pressure supplied to a hydraulic pressure servo of the friction engagement element being released is reduced by controlling the duty of a solenoid valve associated with the friction engagement element being released while a regulated hydraulic pressure supplied to a hydraulic pressure servo of the friction engagement element being engaged is increased by controlling the duty of a solenoid valve associated with the friction engagement element being engaged.

Because of the hydraulic pressure regulating control apparatus for changing the transmission ratio by switching over the engagement of two friction engagement elements, that is, for carrying out the so-called clutch-to-clutch transmission-ratio shift, the magnitude of a shift shock can be reduced by means of a compact automatic transmission mechanism having little involvement of one-way clutches. Nevertheless, for the hydraulic pressure servo of each of the friction engagement elements involved in the clutch-to-clutch transmission-ratio shift, a solenoid valve is required. Because a solenoid valve is provided for each of the hydraulic servos of the friction engagement elements, the control apparatus becomes inevitably large in size as well as complex.

SUMMARY OF THE INVENTION

It is thus an object of the present invention to provide a compact control apparatus for an automatic transmission wherein a clutch-to-clutch transmission-ratio shift is carried out on friction engagement elements by using a solenoid valve, which is originally provided for other purposes, as a regulated-pressure controlling means for controlling the hydraulic pressure supplied to a hydraulic servo of a band brake in the self-loosening direction.

In the self-tightening direction of a band brake, the sensitivity of the band brake engaging force to variations in hydraulic pressure supplied to a hydraulic servo of the band brake is high because the engaging force is multiplied by the self-tightening of the band brake; the friction between the brake band and the brake drum rotating in the self-tightening direction increases the tightening force of the band brake. In the self-loosening direction, on the other hand, the sensitivity of the engaging force is low because the self-tightening does not exist; the friction between the brake band and the brake drum rotating in the self-loosening direction tends to decrease the tightening force making the brake band less sensitive to the engaging force.

An embodiment of a control apparatus in accordance with the present invention comprises a plurality of friction engagement elements, such as brakes, clutches, etc., which change transmission paths of the automatic transmission. A first friction engagement element includes a brake band. A first transmission-ratio shift is accomplished by a clutch-to-clutch transmission-ratio shift of the first and second friction engagement elements, and a second transmission-ratio shift different from the first transmission-ratio shift is accomplished by engaging or disengaging the first friction engagement element. A first linear solenoid valve generates a control hydraulic pressure exclusively for regulating a first regulated hydraulic pressure to be supplied to hydraulic servos of the friction engagement elements. A second linear solenoid valve generates a control hydraulic pressure in a first control region for carrying out control other than regulating the first regulated hydraulic pressure to be supplied to the hydraulic servos of the friction engagement elements and, in addition, generates a control hydraulic pressure in a second control region virtually different from the first control region for regulating a second regulated hydraulic pressure. A first pressure regulating valve generates the first regulated hydraulic pressure with a relatively small control gain in accordance with the control hydraulic pressure generated by the first linear solenoid valve. A second pressure regulating valve generates the second regulated hydraulic pressure with a relatively large control gain in accordance with the control hydraulic pressure generated by the second linear solenoid valve in the second control region. One or more switching devices selectively pass on either the first regulated hydraulic pressure generated by the first pressure regulating valve or the second regulated hydraulic pressure generated by the second pressure regulating valve to either a hydraulic servo of the first friction engagement element or a hydraulic servo of the second friction engagement element. The first friction engagement element is used in a self-loosening direction in the first transmission-ratio shift and in a self-tightening direction in the second transmission-ratio shift. In the first transmission-ratio shift, the switching device or devices pass on the first regulated hydraulic pressure generated by the first pressure regulating valve to the hydraulic servo of the second friction engagement element and pass the second regulated hydraulic pressure generated by the second pressure regulating valve to the hydraulic servo of the first friction engagement element. In the second transmission-ratio shift, the switching device or devices pass on the first regulated hydraulic pressure generated by the first pressure regulating valve to the hydraulic servo of the first friction engagement element.

In another aspect of the control apparatus for an automatic transmission, the control hydraulic pressure generated by the second linear solenoid valve in the first control region is a throttle pressure which represents a throttle opening and is supplied to a primary regulator valve for controlling a line pressure.

In still another aspect of the control apparatus for an automatic transmission, the switching devices comprise a first shift valve for selectively connecting a hydraulic path from the first pressure regulating valve to either the hydraulic servo of the first friction engagement element or the hydraulic servo of the second friction engagement element, and a bi-directional check valve for passing on the highest among the first regulated hydraulic pressure supplied by the first pressure regulating valve through the first shift valve and the second regulated hydraulic pressure supplied by the second pressure regulating valve to the hydraulic servo of the first friction engagement element; and the second pressure regulating valve generates the second regulated hydraulic pressure only when the second linear solenoid valve generates the control hydraulic pressure in the second control region.

In a further aspect of the control apparatus for an automatic transmission, the first transmission-ratio shift is a shift from a high-speed ratio (fifth or fourth) to a medium-speed ratio (fourth low or third) and the second transmission-ratio shift is a shift from the medium-speed ratio (third) to a low-speed ratio (second). The switching devices further include a second shift valve to be actuated in a shift from the low-speed ratio (second) to a very-low-speed ratio (first). At the very-low-speed ratio (first), the second shift valve cuts a hydraulic path between the second pressure regulating valve and the bi-directional check valve 30.

During the first transmission-ratio shift, a clutch-to-clutch transmission-ratio shift wherein the first friction engagement element is engaged or disengaged and the second friction engagement element is also engaged or disengaged, the switching devices are switched over to and maintained in such states as to pass on the first regulated hydraulic pressure generated by the first pressure regulating valve to the hydraulic servo of the second friction engagement element and the second regulated hydraulic pressure generated by the second pressure regulating valve to the hydraulic servo of the first friction engagement element.

At that time, control is carried out to let the first linear solenoid valve, provided exclusively for hydraulic servos, generate the control hydraulic pressure substantially over the entire control region of the first linear solenoid valve so that the first pressure regulating valve generates the first regulated hydraulic pressure with a small control gain and with a high degree of accuracy for engaging or disengaging the second friction engagement element smoothly. On the other hand, the control hydraulic pressure in the second control region is supplied to the second pressure regulating valve from the second linear solenoid valve. As described earlier, the second linear solenoid valve also operates in the first control region for other control purposes in addition to the second control region, a relatively narrow margin control region used for controlling the first friction engagement element. That is to say, during the first transmission-ratio shift, control is carried out to let the second linear solenoid valve generate the control hydraulic pressure over the second control region of the second linear solenoid valve so that the second pressure regulating valve generates the second regulated hydraulic pressure with a large control gain and a low degree of accuracy for engaging or disengaging the first friction engagement element smoothly. Since the first friction engagement element, a band brake, at that time is used in the self-loosening direction, the engaging force thereof is not sensitive to variations in second regulated hydraulic pressure supplied to the hydraulic servo of the first friction engagement element, allowing the first friction engagement element to keep up with the second regulated hydraulic pressure and to be engaged or disengaged smoothly.

During the second transmission-ratio shift, wherein only the first friction engagement element is engaged or disengaged, the switching devices are switched over to and maintained in such states as to pass on the first regulated hydraulic pressure generated by the first pressure regulating valve to the hydraulic servo of the first friction engagement element. At that time, since the first friction engagement element which serves as a band brake is used in the self-tightening direction, the engaging force thereof is sensitive to variations in first regulated hydraulic pressure supplied to the hydraulic servo of the first friction engagement element because of the self-servo power. As a result, the first friction engagement element can be engaged or disengaged smoothly by the first regulated hydraulic pressure generated by the first pressure regulating valve which is controlled with a high degree of accuracy substantially over the entire control region thereof as described above.

In the control apparatus during a clutch-to-clutch transmission-ratio shift of the first and second friction engagement elements, the first friction engagement element including a band brake is used in the self-loosening direction wherein the engaging force thereof is not sensitive to variations in hydraulic pressure. Thus, even in the second control range, that is, a margin control region of the second linear solenoid valve, the first friction engagement element can be controlled to be engaged or disengaged with a sufficient degree of accuracy while reserving a required hydraulic pressure by means of the second pressure regulating valve which has a relatively large control gain. In this way, a simple and compact construction is achieved by using a solenoid valve originally intended for other control purposes as a means for controlling the regulated pressure.

In addition, during the clutch-to-clutch transmission-ratio shift described above, the second friction engagement element can be engaged or disengaged smoothly and with a high degree of accuracy by the first pressure regulating valve substantially over the entire control range thereof. On the other hand, during the transmission-ratio shift different from the clutch-to-clutch shift, the first friction engagement element is used in the self-tightening direction and can be engaged or disengaged smoothly with a high-degree of accuracy by the first pressure regulating valve, allowing shift shock to be reduced.

Although the second linear solenoid valve is used also for controlling a regulated hydraulic pressure supplied to the hydraulic servo of the first friction engagement element as described above, the control can be performed sufficiently over a relatively narrow control-hydraulic range (the second control region) based on the self-loosening direction of the band brake. Thus, a sufficient hydraulic pressure control range (the first control region) is ensured for the other intrinsically required control function.

Since the second linear solenoid valve is intrinsically used for controlling throttle pressure, the second control region is located above the high end of the first control region, resulting in a high line pressure. Nevertheless, the high line pressure has no negative effects since other hydraulic servos are either engaged or drained.

If the control apparatus has a switching device constructed as one shift valve, a problem described as follows will arise. During the first transmission-ratio shift, for example, from a third ratio to a fourth ratio, the hydraulic pressure of the hydraulic servo of the first friction engagement element is reduced, while the hydraulic pressure of the hydraulic servo of the second friction engagement element is increased. Prior to the transmission-ratio shift, the first pressure regulating valve is connected to the hydraulic servo of the first friction engagement element. However, during the transmission-ratio shift when the first shift valve is switched over, the hydraulic servo of the first friction engagement element is temporarily connected to neither the first pressure regulating valve nor the second pressure regulating valve causing the hydraulic pressure of the first friction engagement element to be reduced.

In order to solve the above problem, the bi-directional check valve is included in the switching devices. Since the bi-directional check valve enables the hydraulic pressure generated by the second pressure regulating valve to be supplied without a delay even when the hydraulic path connecting the first pressure regulating valve to the hydraulic servo of the first friction engagement element is cut after the first shift valve has been switched over, the abovementioned reduction never occurs.

During the second transmission-ratio shift (for example, from the second ratio to the third ratio or from the third to the second), an attempt is made to control the hydraulic pressure of the hydraulic servo of the first friction engagement element by means of the first pressure regulating valve. At the same time, the second linear solenoid valve is used for other control purposes in the first control region, causing the second pressure regulating valve to generate a regulated hydraulic pressure in the first control region. In this case, if the hydraulic pressure of the hydraulic servo of the first friction engagement element is lower than the regulated hydraulic pressure generated by the first pressure regulating valve, there is a probability that the regulated hydraulic pressure generated by the second pressure regulating valve is supplied to the hydraulic servo of the first friction engagement element through the bi-directional check valve. In order to solve this problem, the second pressure regulating valve is set so that it generates a regulated hydraulic pressure only when the second linear solenoid valve generates a control hydraulic pressure in the second control region. More specifically, the spring load of the second pressure regulating valve is increased. In this way, when the second linear solenoid valve is used for other control purposes in the first control region, the second pressure regulating valve does not generate a regulated hydraulic pressure. As a result, the control of the hydraulic pressure of the hydraulic servo for the first friction engagement element by the first pressure regulating valve can be prevented from being affected by the second pressure regulating valve.

In the transmission control apparatus, in general, it is the line pressure of a low-speed ratio that requires a high control hydraulic pressure generated by the second linear solenoid valve. Accordingly, at a low-speed ratio such as the first ratio, it is necessary for the second linear solenoid valve to generate a high control hydraulic pressure at the high end of the first control region close to the second control region. The second pressure regulating valve is set to generate a regulated hydraulic pressure only when the second linear solenoid valve generates a control hydraulic pressure in the second control region. Nevertheless, the control hydraulic pressure may inadvertently enter the second control region for some reason, causing the second pressure regulating valve to generate a regulated hydraulic pressure supplied to the hydraulic servo of the first friction engagement element.

In order to solve the problem caused by a regulated hydraulic pressure inadvertently supplied to the hydraulic servo by cutting a hydraulic path between the second pressure regulating valve and the bi-directional check valve and using the second shift valve, a hydraulic pressure is reliably prevented from being supplied to the hydraulic servo of the first friction engagement element from the second pressure regulating valve.

Additional objects, advantages and features of the present invention will become apparent from following detailed description of preferred embodiments with reference to the following accompanying drawings.

DETAILED DESCRIPTION OF THE PREFERRED EMBODIMENTS

Figure 1:
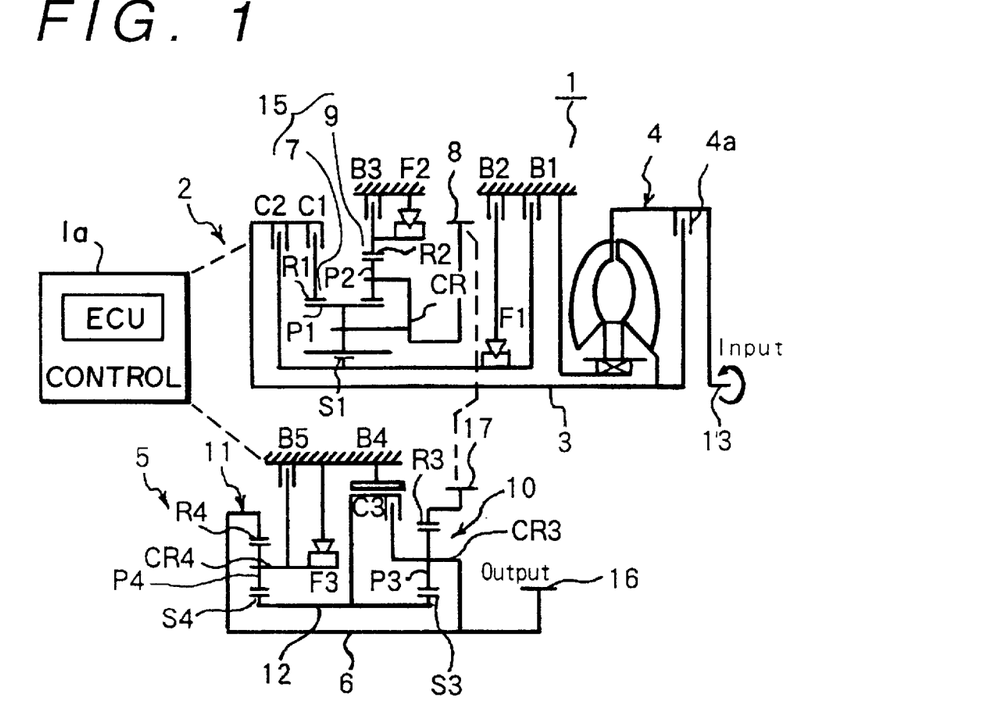
FIG. 1 is a skeleton diagram of an automatic transmission suitable for control in accordance with the present invention.

As shown in FIG. 1, a 5-speed automatic transmission 1 comprises a torque converter 4, a 3-speed main transmission mechanism 2, a 3-speed auxiliary transmission mechanism 5 and a differential unit (not shown). These components are connected to each other to form a single construction accommodated in a case. The torque converter 4, which is provided with a lock-up clutch 4a, receives torque from an engine crank shaft 13, supplying the torque to an input shaft 3 of the main transmission mechanism 2 through a hydraulic flow in the torque converter 4 or through the mechanical joint of the lock-up clutch 4a. The first shaft 3 (input shaft) aligned with the crank shaft, a second shaft 6 (counter shaft) arranged parallel to the first shaft 3, and a third shaft (including left and right vehicle axle shafts—not shown) are rotatably supported in the crank case. A control 1a includes an electronic control unit ECU, various sensors (not shown), and a hydraulic pressure control circuit (described later) for operating the friction engagement elements (clutches and brakes—described later) of the main and auxiliary transmission mechanisms 2 and 5.

The main transmission mechanism 2 has a planetary gear unit 15 which comprises a simple planetary gear 7 and a double-pinion planetary gear 9. The simple planetary gear 7 comprises a sun gear (a long gear) S1, a ring gear R1 and a carrier CR for supporting a pinion P1, a long pinion to be engaged with the sun and ring gears S1 and R1. On the other hand, the double-pinion planetary gear 9 comprises the sun gear S1 shared with the simple planetary gear 7, a ring gear R2 and the carrier CR also shared with the simple planetary gear 7. As a component of the double-pinion planetary gear 9, the carrier CR supports the pinion P1 and a pinion P2 of the double-pinion planetary gear 9 in such a way that they are mutually engaged with each other. The pinion P1 which is also shared with the simple planetary gear 7 is engaged with the sun gear S1 whereas the pinion P2 is engaged with the ring gear R2.

The input shaft 3 which is associated with the crank shaft 13 through the torque converter 4 can be linked to the ring gear R1 of the simple planetary gear 7 through a first (forward) clutch C1 and to the common sun gear S1 through a second (direct) clutch C2. The sun gear S1 can be halted directly by a first brake B1 and halted against reverse rotation by a second brake B2 through a first one-way clutch F1. On the other hand, the ring gear R2 of the double-pinion planetary gear 9 can be halted by a third brake B3 and is restricted to forward rotation by a second one-way clutch F2. The common carrier CR is linked to a counter drive gear 8 which serves as an output member of the main transmission mechanism 2.

On the other hand, the auxiliary transmission mechanism 5 comprises an output gear 16, a first simple planetary gear 10 and a second simple planetary gear 11 which are arranged sequentially in the axial direction of the second shaft 6 serving as a counter shaft toward the rear side. The counter shaft 6 is rotatably supported by the single-construction case through a bearing. The first and second simple planetary shafts 10 and 11 are both of the Simpson type.

As for the first simple planetary gear 10, a ring gear R3 is connected to a counter driven gear 17 which is engaged with the counter drive gear 8. A sun gear S3 is fixed to a sleeve shaft 12 which is rotatably supported by the counter shaft 6. A pinion P3 is supported by a carrier CR3, a flange with one of the ends thereof connected to the counter shaft 6 to form an assembly. The other end of the carrier CR3 is connected to an inner hub of a third (UD direct) clutch C3. As for the second simple planetary gear 11, on the other hand, a sun gear S4 is formed on the sleeve shaft 12 and connected to the sun gear S3 of the first simple planetary gear 10. A ring gear R4 is linked to the counter shaft 6.

The third (UD direct) clutch C3 is provided between the carrier CR3 and the sleeve shaft 12 on which the sun gears S3 and S4 are mounted and which can be halted by a fourth brake B4 serving as a band brake. A carrier CR4 supporting a pinion P4 of the second simple planetary gear 11 can be halted by a fifth brake B5 and is restricted to forward rotation by a third one-way clutch F3.

Next, a hydraulic pressure control circuit employed in the 5-speed automatic transmission 1 is explained with reference to FIGS. 2 and 3. It is noted that only components of the hydraulic control circuit required for explaining effect of the present embodiment are described along with interconnection of those components. The actual hydraulic circuit, included in the control 1a of FIG. 1, comprises many more components and is, thus, complex. Various electrically operated components, such as solenoid valves, etc., are controlled by the ECU of the control 1a as described herein and/or in a conventional manner.

Figure 3:
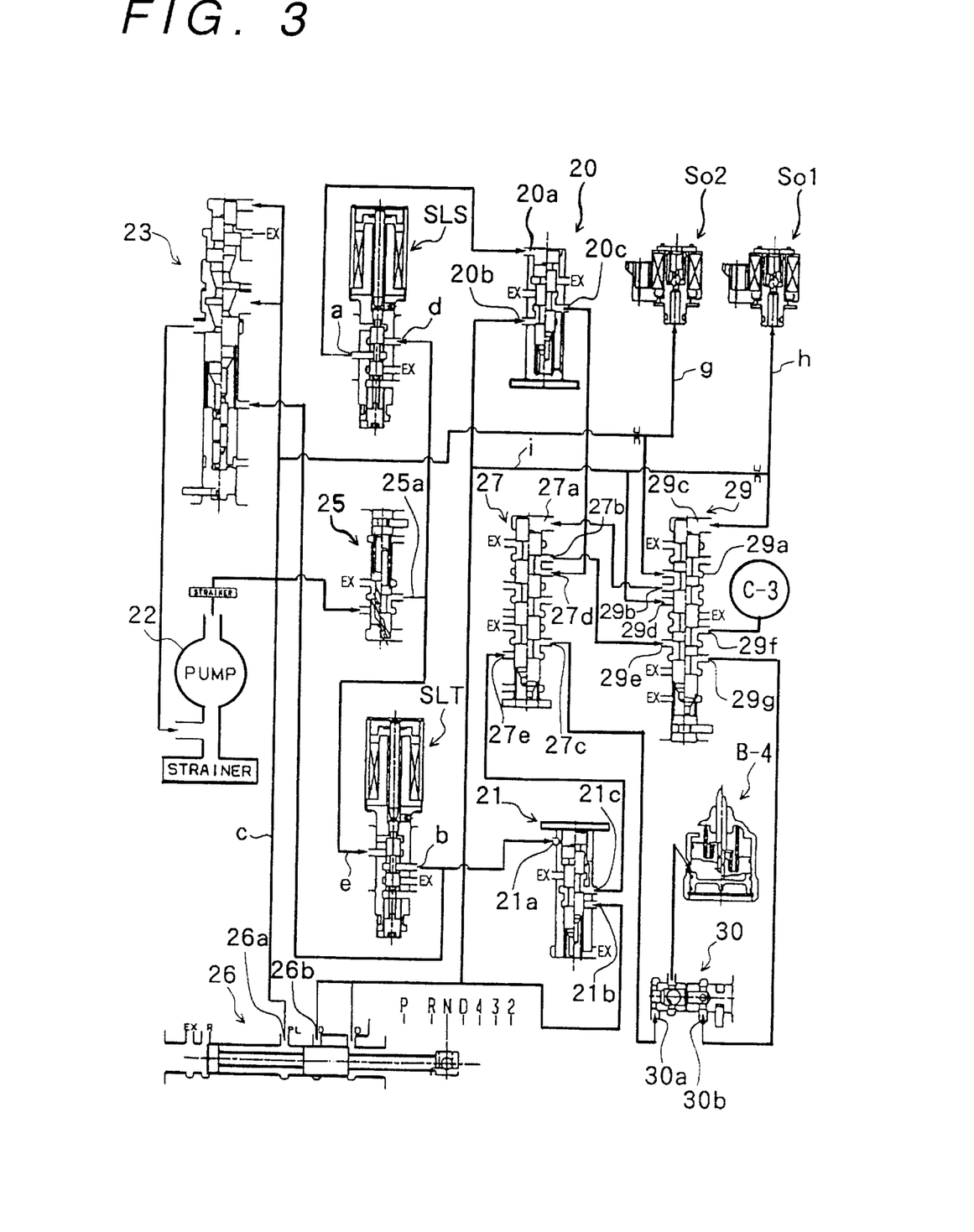
FIG. 3 is a diagram showing a hydraulic control circuit for an automatic transmission in accordance with an embodiment of the present invention.

Notations So1 and So2 shown in FIG. 3 each denote a solenoid valve which is controlled to be turned on and off. Notations SLS and SLT each denote a linear solenoid valve. It should be noted that the solenoid valve So1 is normally closed while the solenoid valve So2 is normally open and that the solenoid valves So1 and So2, when open, connect lines h and g, supplied by hydraulic pressure through restrictions, to exhaust. The first linear solenoid valve SLS is used specially for regulating a hydraulic pressure supplied to hydraulic servos. The second linear solenoid valve SLT is, on the other hand, operated in accordance with a throttle opening which is determined by the operation of an acceleration pedal carried out by the operator. While the main function of the second (throttle-pressure-control) linear solenoid valve SLT is to regulate a throttle pressure, it also performs an auxiliary function of regulating a hydraulic pressure supplied to a hydraulic servo B-4 of the fourth brake (band brake) B4.

Reference numeral 20 denotes a shift-pressure control valve (the first pressure regulating valve) while reference numeral 21 denotes a B-4 control valve (the second pressure regulating valve). A control hydraulic pressure $P_{SLS}$ of an output port (a) of the first linear solenoid valve SLS is supplied to a control hydraulic chamber 20a of the valve 20. Likewise, a control hydraulic pressure $P_{SLT}$ of an output port (b) of the second linear solenoid valve SLT is supplied to a control hydraulic chamber 21a of the valve 21. The shift-pressure control valve 20 regulates a line pressure supplied to an input port 20b thereof in accordance with the control hydraulic pressure $P_{SLS}$, outputting the regulated line pressure to an output port 20c. Similarly, the B-4 control valve 21 regulates a line pressure supplied to an input port 21b thereof in accordance with the control hydraulic pressure $P_{SLT}$, outputting the regulated line pressure to an output port 21c.

Figure 7:
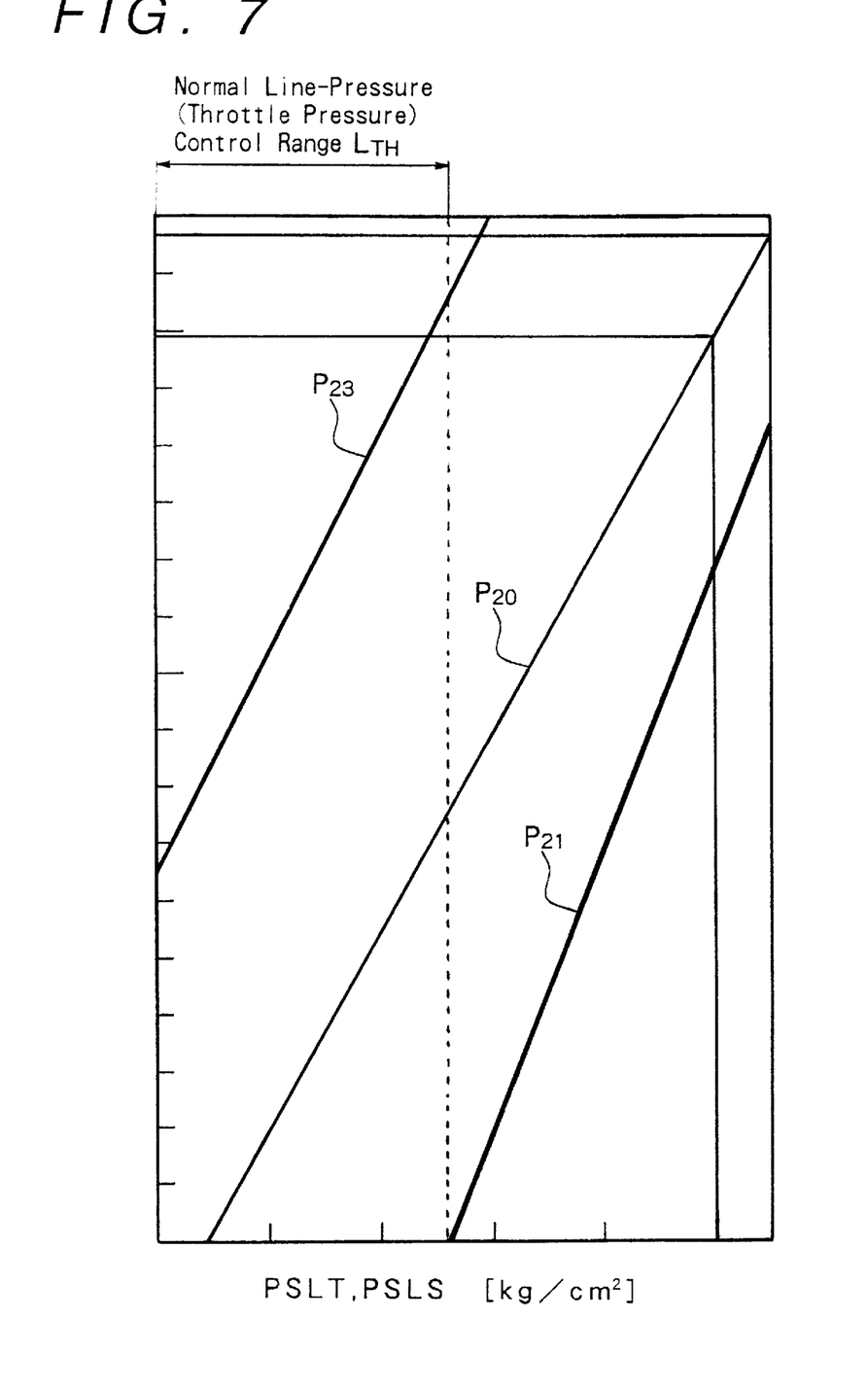
FIG. 7 is a graph of characteristics of pressure regulating valves.

Furthermore, a load spring or the like is set in the shift-pressure control valve 20 in such a way that the control hydraulic pressure $P_{SLS}$ substantially over the entire range of the first linear solenoid valve SLS can be utilized as shown in FIG. 7. In this way, a first regulated hydraulic pressure $P_{20}$ can be output with a relatively small control gain with respect to the control hydraulic pressure $P_{SLS}$, allowing the line pressure to be regulated with a high degree of accuracy.

On the other hand, as shown in FIG. 7, a relatively strong load spring is set in the B-4 control valve 21, outputting a second regulated hydraulic pressure $P_{21}$ with a relatively large control gain with respect to the control hydraulic pressure $P_{SLT}$. As shown in the FIG. 7, the second regulated hydraulic pressure $P_{21}$ rises with the control hydraulic pressure $P_{SLT}$ in a second control region to be described later. As described earlier, the second linear solenoid valve SLT is originally used for controlling the throttle pressure. To put it in detail, in a normal line-pressure control application range, that is, in a first control region shown in FIGS. 5 and 6, the second linear solenoid valve SLT supplies the control hydraulic pressure $P_{SLT}$ as a throttle pressure to a primary regulator valve 23 for controlling a line pressure $P_{23}$ as will be described later. In a margin control region beyond the first control region, that is, in the second control region shown in FIGS. 5 and 6, on the other hand, the second linear solenoid valve SLT controls the B-4 control valve 21.

Reference numeral 22 denotes a hydraulic pump and reference numeral 23 denotes the primary regulator valve. Reference numeral 25 denotes a solenoid modulator valve. In accordance with a control hydraulic pressure (the throttle pressure) $P_{SLT}$ supplied by the second linear solenoid valve SLT, the primary regulator valve 23 regulates a hydraulic pressure supplied by the hydraulic pump 22 to a line pressure $P_{23}$ output to a line-path (c). On the other hand, the solenoid modulator valve 25 reduces the hydraulic pressure from the hydraulic pump 22, outputting a hydraulic pressure from an output port 25a thereof to an input port (d) of the first linear solenoid valve SLS and an input port (e) of the second linear solenoid valve SLT. Reference numeral 26 denotes a manual valve for connecting a hydraulic path from a line-pressure port 26a to an output port thereof in accordance with the operation position of a shift lever. For example, with the shift lever placed at a position D, 4, 3 or 2, the hydraulic path from the line-pressure port 26a is connected to an output port 26b.

Reference numeral 27 denotes a first (U1) shift valve for use by the auxiliary transmission mechanism 5 and reference numeral 29 is a second (U2) shift valve also for use by the auxiliary transmission mechanism 5. Reference numeral 30 denotes a B-4 bi-directional check valve, a kind of bi-directional check valve. The first (U1) shift valve 27, the second (U2) shift valve 29 and the B-4 bi-directional check valve 30 constitute a switching means for supplying and releasing hydraulic pressures to and from hydraulic servos C-3 and B-4 of the third (UD direct) clutch C3 and the fourth brake (band brake) B4 respectively.

Figure 4:
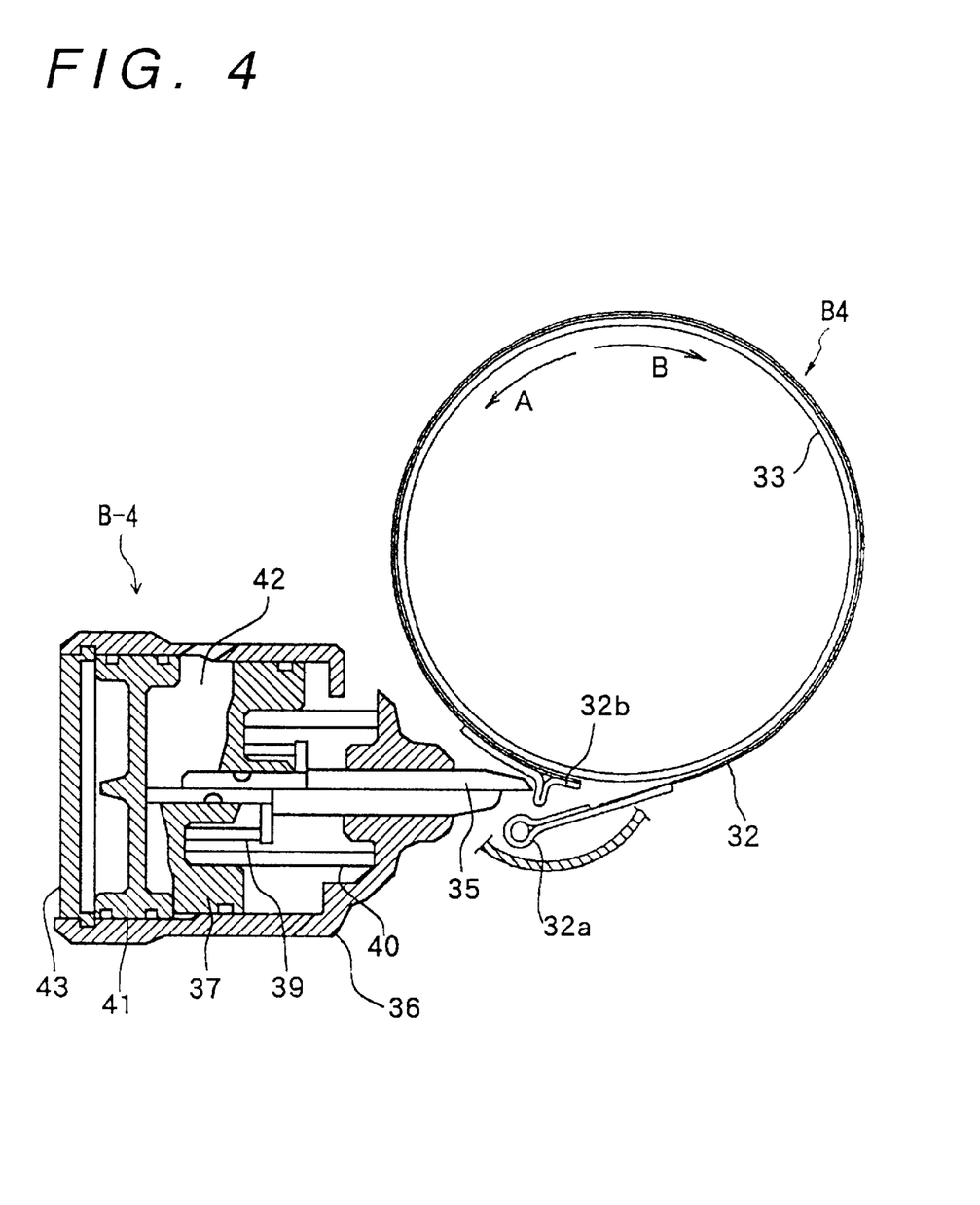
FIG. 4 is a section view of a band brake and a hydraulic servo employed as a friction engagement element of the transmission of FIG. 1.

As shown in FIG. 4, the fourth brake (band brake) B4 has a band 32, one end 32a of which is fixed to the case. The band 32 is wound around a drum 3 connected to the sun gears S3 and S4 to form an assembly. The sun gears S3 and S4 are also connected to each other as described earlier. The other end 32b of the band is placed at a location in close proximity to a piston rod 35 of the hydraulic servo B-4 of the fourth brake (band brake) B4. The hydraulic servo B-4 has a piston 37 engaged with a cylinder case 36 through a hydraulically sealed junction. Return springs 39 and 40 are installed in the compressed state between one side of the piston 37 and the cylinder case 36. An end plate 41 is also engaged with the cylinder case 36 through a hydraulically sealed junction but can not move in the axial direction. A brake engaging hydraulic chamber 42 is provided between the end plate 41 and the other side of the piston 37. One end of the cylinder case 36 is blocked by a cover 43 and the piston rod 35 fixed on the piston 37 protrudes out from the other end of the cylinder case 36, being brought in contact with the other end 32b of the band 32 of the fourth brake (band brake) B4.

The fourth brake B4, which is a band brake, has a strong engaging force generated by a self-servo power in the self-tightening direction A of rotation of the drum 33 but has only a relatively weak engaging force in the self-loosening direction B because the self-servo power does not exist. As a result, the sensitivity of an engaging force to variations in hydraulic pressure supplied to the brake engaging hydraulic chamber 42 of the hydraulic servo B-4 is high in the self-tightening direction A because the engaging force (the torque capacity) is amplified but, in the self-loosening direction B, the sensitivity of the engaging force to variations in hydraulic pressure is low, enabling pressure control with a relatively low degree of accuracy.

Next, operation of this embodiment will be explained. The explanation begins with operation of the mechanisms of the 5-speed automatic transmission with reference to FIGS. 1 and 2.

At a first ratio of the automatic transmission 1 in the D (drive) range, the forward clutch C1 is engaged and the second and third one-way clutches F2 and F3 are also engaged, operating so as to maintain the ring gear R2 of the double-pinion planetary gear 9 and the carrier CR4 of the second simple planetary gear 11 in the halted state. In this state, the rotation of the input shaft 3 is transmitted to the ring gear R1 of the simple planetary gear 7 through the forward clutch C1. In addition, since the ring gear R2 of the double-pinion planetary gear 9 is halted, the common carrier CR is rotated in the positive direction at a substantially reduced rotational speed while the sun gear S1 is rotating in the reverse direction. That is to say, the main transmission mechanism 2 is in the state of a first gear ratio thereof and the rotation at the reduced rotational speed is transmitted to the ring gear R3 of the first simple planetary gear 10 in the auxiliary transmission mechanism 5 through the counter gears 8 and 17. With reverse rotation of the carrier CR4 of the second simple planetary gear 11 halted by the third one-way clutch F3 and the sun gears S3 and S4 rotating in the reverse direction, the auxiliary transmission mechanism 5 is also in the state of a first gear ratio thereof. In this state, the rotation of the main transmission mechanism 2 at the reduced rotational speed is further slowed down by the auxiliary transmission mechanism 5 and output from an output gear 16.

At a second ratio of the automatic transmission 1, the second brake B2 is engaged in addition to the engagement of the forward clutch C1. Furthermore, the engagement is switched over from the second one-way clutch F2 to the first one-way clutch F1 and the third one-way clutch F3 is maintained in the operating state. In this state, the reverse rotation of the common sun gear S1 is halted by the second brake B2 and the first one-way clutch F1. As a result, the rotation of the ring gear R1 of the simple planetary gear 7 transmitted from the input shaft 3 through the forward clutch C1 causes the carrier CR to rotate in the positive direction while keeping the ring gear R2 of the double-pinion planetary gear 9 in a rotating state in the positive direction. In addition, the rotation at the reduced rotational speed is transmitted to the auxiliary transmission mechanism 5 through the counter gears 8 and 17. That is to say, the main transmission mechanism 2 is in the state of a second gear ratio thereof while the auxiliary transmission mechanism 5 is in the state of the first gear ratio thereof due to the engagement of the third one-way clutch F3. As a result of combining the state of the second gear ratio of the main transmission mechanism 2 and the state of the first gear ratio of the auxiliary transmission mechanism 5, the second ratio is obtained in the automatic transmission 1 as a whole.

At a third ratio of the automatic transmission 1, the forward clutch C1, the second brake B2 and the first one-way clutch F1 are maintained in the engaged state. In addition, the engagement of the third one-way clutch F3 is released while, at the same time, the fourth brake (band brake) B4 is engaged. That is to say, the main transmission mechanism 2 is sustained in the state thereof as it is and the rotation at the second gear ratio thereof described above is transmitted to the auxiliary transmission mechanism 5 through the counter gears 8 and 17. In addition, in the auxiliary transmission mechanism 5, the rotation from the ring gear R3 of the first simple planetary gear 10 is output to the carrier CR3 as a rotation at a second gear ratio thereof due to the fact that the reverse rotation of the sun gear S3 is halted by the brake B4. As a result of combining the state of the second gear ratio of the main transmission mechanism 2 and the state of the second gear ratio of the auxiliary transmission mechanism 5, the third ratio is obtained in the automatic transmission 1 as a whole.

At a fourth ratio of the automatic transmission 1, the main transmission mechanism 2 is in the same states as the above states at the second and third ratios of the automatic transmission 1 or at the second gear ratio of the main transmission mechanism 2 wherein the forward clutch C1, the second brake B2 and the first one-way clutch F1 are engaged. In the auxiliary transmission mechanism 5, on the other hand, the fourth brake (band brake) B4 is disengaged while the third (UD direct) clutch C3 is engaged. In this state, the ring gear R3 and the sun gear S3 of the first simple planetary gear 10 are both connected to the sun gear S4 of the second simple planetary gear 11, putting the first and second simple planetary gears 10 and 11 in a directly-coupled state wherein the first and second simple planetary gears 10 and 11 both rotate integrally. As a result of combining the state of the second gear ratio of the main transmission mechanism 2 and the state of a third gear ratio, that is, the directly-coupled state of the auxiliary transmission mechanism 5, a rotation of the fourth ratio in the automatic transmission 1 as a whole is output from the output gear 16.

At a fifth ratio of the automatic transmission 1, the forward clutch C1 and the direct clutch C2 are engaged and the rotation of the input shaft 3 is transmitted to the ring gear R1 of the simple planetary gear 7 and the common sun gear S1. The main transmission mechanism 2 is thus in a directly-coupled state wherein the planetary gear unit 15 rotates integrally. In addition, the auxiliary transmission mechanism 5 is in a directly-coupled state with the third (UD direct) clutch C3 engaged. As a result of combining the state of a third gear ratio, that is, the directly-coupled state of the main transmission mechanism 2 and the state of the third gear ratio, that is, the directly-coupled state of the auxiliary transmission mechanism 5, a rotation at the fifth ratio in the automatic transmission 1 as a whole is output from the output gear 16.

Furthermore, the automatic transmission 1 also has intermediate ratios, that is, a third low ratio and a fourth low ratio which are engaged during acceleration or a down shift.

At the third low ratio, the forward clutch C1 and the direct clutch C2 are engaged. Actually, the second brake B2 is also engaged but is over-run by the one-way clutch F1. The main transmission mechanism 2 is in a state of the third gear ratio thereof with the planetary gear unit 15 thereof directly coupled. On the other hand, the third one-way clutch F3 is engaged, putting the auxiliary transmission mechanism 5 in a state of the first gear ratio thereof. As a result of combining the state of the third gear ratio of the main transmission mechanism 2 and the state of the first gear ratio of the auxiliary transmission mechanism 5, a ratio between the second and third ratios, that is, the third low transmission described above is obtained in the automatic transmission 1 as a whole.

At the fourth low ratio, the one-way clutch C1 and the direct clutch C2 are engaged, putting the main transmission mechanism 2 in a state of the third gear ratio thereof with the planetary gear unit 15 thereof put in a directly-connected-rotation state as is the case with the state of the third low ratio. On the other hand, the fourth brake (band brake) B4 is engaged and the sun gear S3 of the first simple planetary gear is halted, putting the auxiliary transmission mechanism 5 in a state of the second gear ratio thereof. As a result of combining the state of third gear ratio of the main transmission mechanism 2 and the state of the second gear ratio of the auxiliary transmission mechanism 5, a ratio between the third and fourth ratios, that is, the fourth low ratio described above is obtained in the automatic transmission 1 as a whole.

Figure 2:
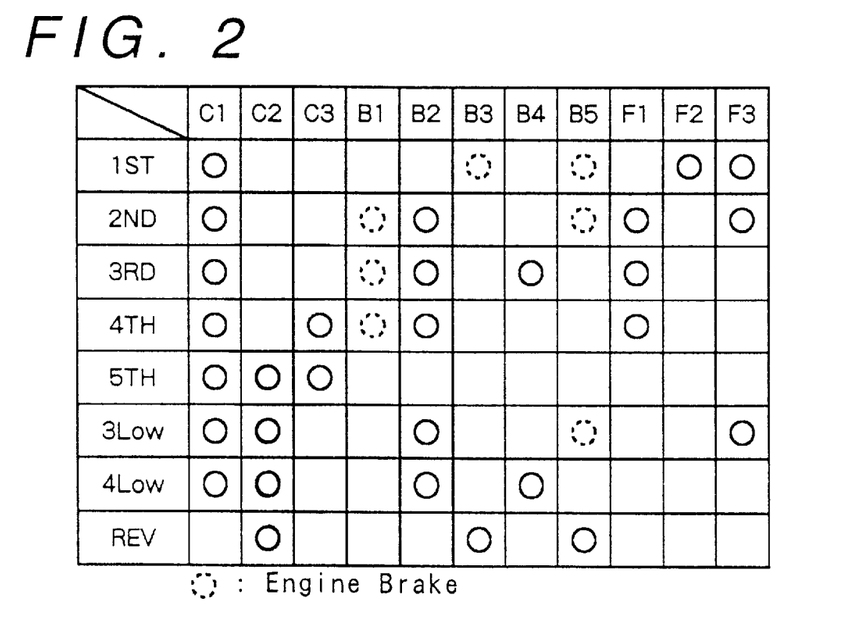
FIG. 2 is a diagram showing operation of friction engagement elements of the automatic transmission shown in FIG. 1.

It should be noted that each dotted-line circle shown in FIG. 2 indicates that a coast engine brake is working in the 4, 3 or 2 range. That is to say, at the first ratio, the third brake B3 is engaged, halting the rotation of the ring gear R2 caused by an over-run by the second one-way clutch F2. In addition, at the first, second, and the third low ratios, the fifth brake B5 is engaged, halting the rotation of the carrier CR4 caused by an over-run by the third one-way clutch F3. Furthermore, at the second, third and fourth ratios, the first brake B1 is engaged, halting the rotation of the sun gear S1 due to an over-run by the first one-way clutch F1.

In the R (reverse) range, the direct clutch C2 and the third brake B3 are both engaged and, at the same time, the fifth brake B5 is also engaged as well. In this state, the rotation of an input shaft 3a is transmitted to the sun gear S1 through the direct clutch C2 and the ring gear R2 of the double-pinion planetary gear 9 is halted by the third brake B3. As a result, while the ring gear R1 of the simple planetary gear 7 is put in a rotation state in the reverse direction, the carrier CR is also rotated in the reverse direction. This rotation in the reverse direction is transmitted to the auxiliary transmission mechanism 5 through the counter gears 8 and 17. The carrier CR4 of the second simple planetary gear 11 is halted also in the reverse rotational direction by the fifth brake B5, maintaining the auxiliary transmission mechanism 5 in the state of the first gear ratio thereof. As a result of combining the rotation of the main transmission mechanism 2 in the reverse direction and the rotation of the auxiliary transmission mechanism 5 at the first gear ratio, a rotation at a reduced rotational speed in the reverse direction is output from the output gear 16.

Next, the operation of this embodiment will be explained.

Figure 5:
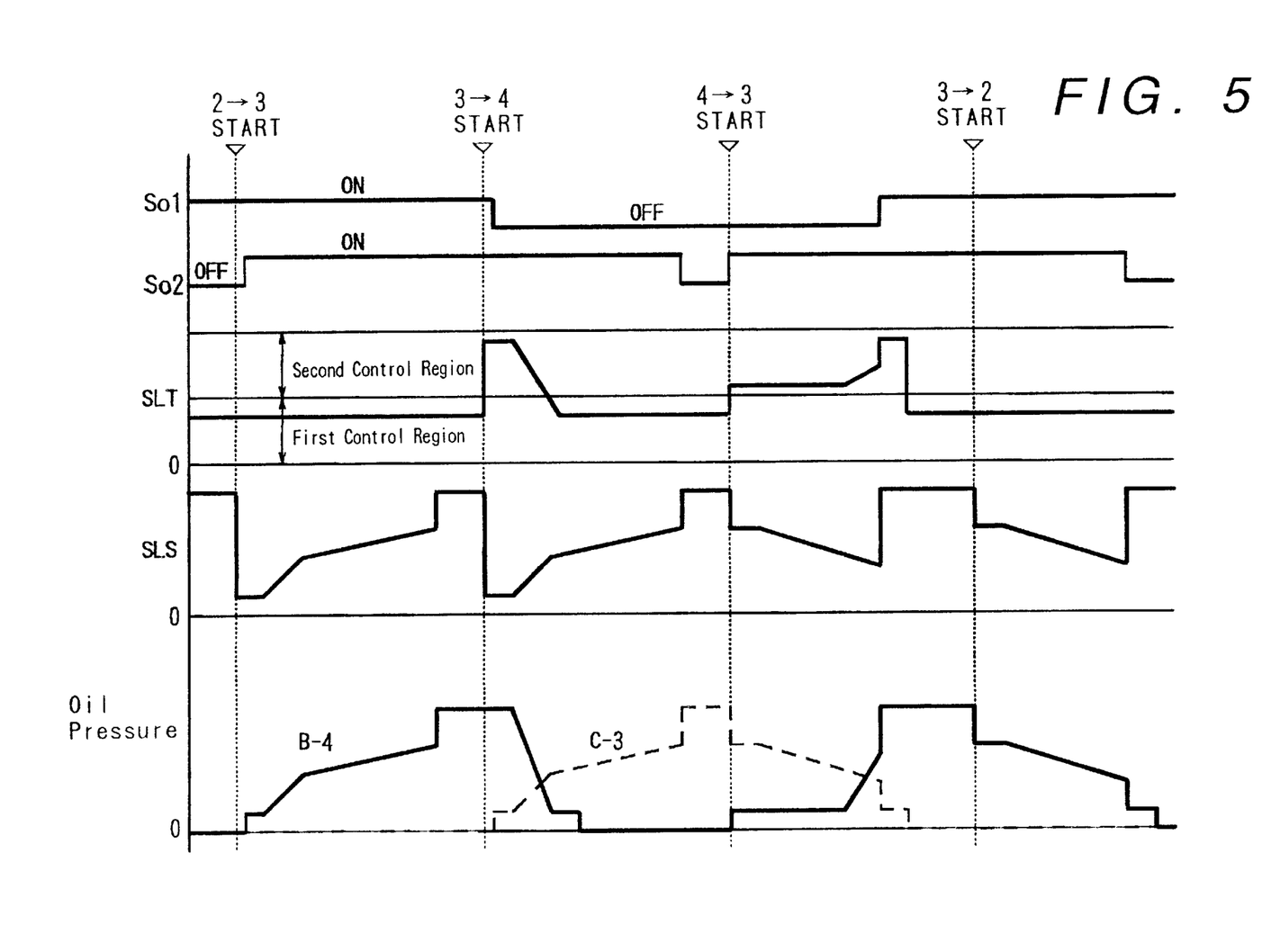
FIG. 5 is a time chart of hydraulic pressures during transmission shifts from a second ratio to a third ratio, from the third to a fourth, from the fourth back to the third and from the third back to the second.
Figure 6:
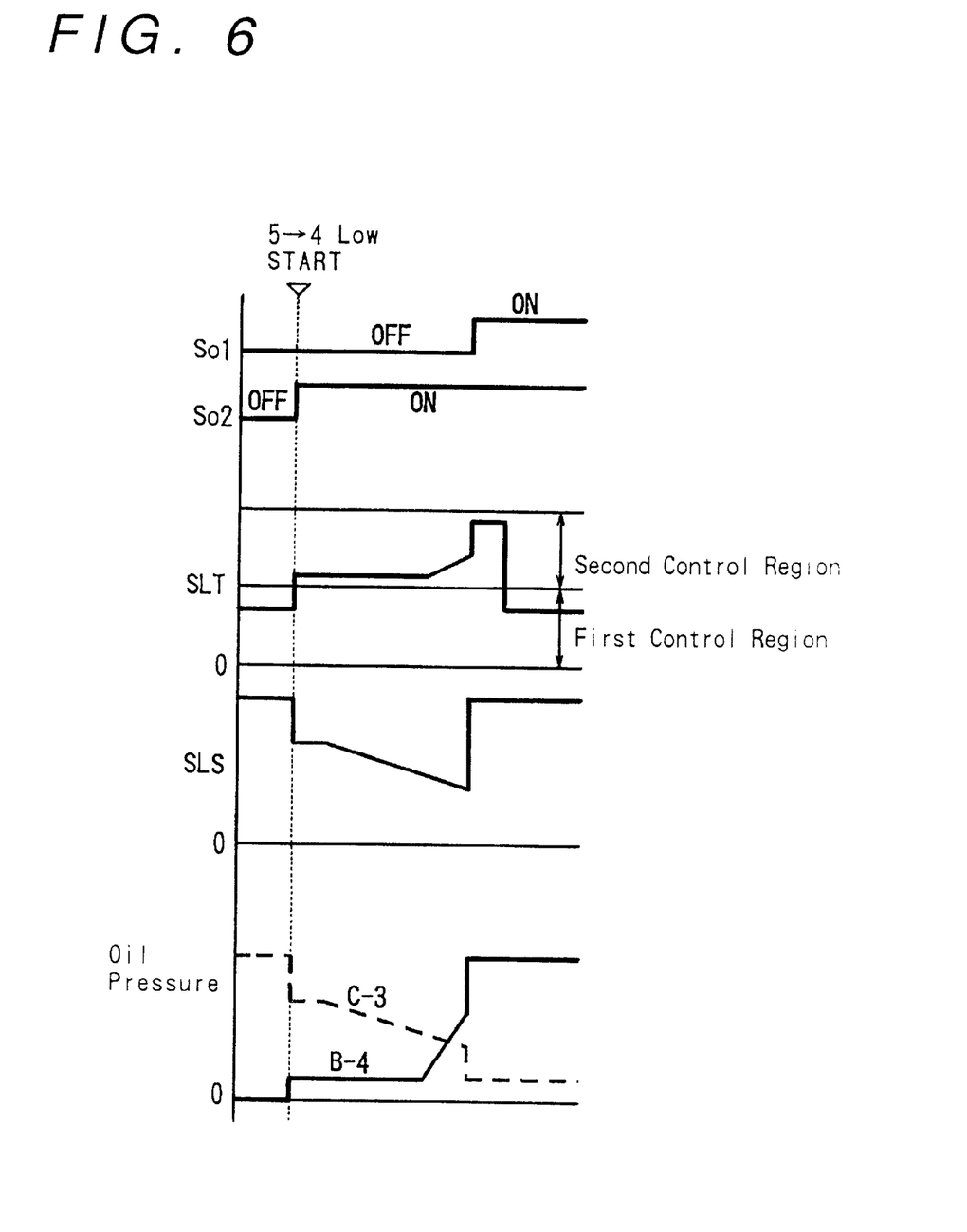
FIG. 6 is a time chart of hydraulic pressures during a shift from a fifth ratio to a fourth low ratio.

First of all, shifts from the second ratio to the third ratio and from the third back to the second will be explained. As described earlier, the shift from the second ratio to the third ratio results from engagement of the fourth brake (band brake) B4 while the shift from the third back to the second is accomplished by disengagement of the fourth brake (band brake) B4. As shown in FIG. 5, at the second ratio, the solenoid valve So1 is turned on while the solenoid valve So2 is turned off. As a result, the second (U2) shift valve 29 is positioned as shown on the left-half side. In this state, a hydraulic path between ports 29a and 29b of the second (U2) shift valve 29 is opened. Since the output hydraulic pressure of the solenoid valve So2 is zero, no hydraulic pressure is supplied to a control hydraulic chamber 27a of the first (U1) shift valve 27, positioning the first (U1) shift valve 27 as shown on the left-half side. As a result, ports 27b and 27c of the first (U1) shift valve 27 are drained and the brake engaging hydraulic chamber 42 of the hydraulic servo B-4 is drained, causing the fourth brake (band brake) B4 to be disengaged.

When the solenoid valve So2 is turned on by a command issued by the control unit 1a to start the shift from the second ratio to the third ratio, a hydraulic pressure rises on a hydraulic path (g), causing a hydraulic pressure to be supplied to the control hydraulic chamber 27a of the first (U1) shift valve 27 through the ports 29a and 29b of the second (U2) shift valve 29. As a result, the first (U1) shift valve 27 is switched over to a position as shown on the right-half side. In this position, the port 27b of the first (U1) shift valve 27 is connected to port 27d receiving a first regulated hydraulic pressure $P_{20}$, FIG. 7, from the first pressure regulating valve 20 whereas the port 27c of valve 27 is connected to port 27e receiving a second regulated hydraulic pressure $P_{21}$ from the second pressure regulating valve 21. The first regulated hydraulic pressure $P_{20}$ from the first pressure regulating valve (shift pressure control valve) 20 (in turn controlled by the first linear solenoid valve SLS) is supplied to an input port 30b of the B-4 bi-directional check valve 30 while the second regulated hydraulic pressure $P_{21}$ from the second pressure regulating valve (B-4 control valve) 21 (in turn controlled by the second linear solenoid valve SLT) is supplied to an input port 30a of the B-4 bi-directional check valve 30.

At that time, the magnitude of the first regulated hydraulic pressure $P_{20}$ generated by the shift-pressure control valve 20 is determined by a regulated-pressure characteristic also denoted by notation $P_{20}$ shown in FIG. 7. The regulated-pressure characteristic denoted by notation $P_{20}$ is a function of $P_{SLS}$, the control hydraulic pressure output by the first linear solenoid valve SLS for hydraulic regulation. Likewise, the magnitude of the second regulated hydraulic pressure $P_{21}$ generated by the B-4 control valve 21 is determined by a regulated-pressure characteristic also denoted by notation $P_{21}$ shown in FIG. 7. The regulated-pressure characteristic denoted by notation $P_{21}$ is a function of $P_{SLT}$, the hydraulic pressure output by the second linear solenoid valve SLT. As shown in FIG. 7, while the first regulated hydraulic pressure $P_{20}$ generated by the shift-pressure control valve 20 starts to rise from a hydraulic pressure in close proximity to the zero point of the control hydraulic pressure $P_{SLS}$, the second regulated hydraulic pressure $P_{21}$ generated by the B-4 control valve 21 starts to rise from a hydraulic pressure beyond a hydraulic-pressure range LTH (corresponding to the first control region shown in FIGS. 5 and 6) of the hydraulic pressure $P_{SLT}$ in the normal line-pressure control which is carried out by using the second linear solenoid valve SLT in conjunction with the primary regulator valve 23. Thus, the hydraulic pressure $P_{SLT}$ with a magnitude ranging from zero to a value in the hydraulic-pressure range LTH of the normal line-pressure control by means of the second linear solenoid valve SLT is supplied as a control hydraulic pressure or a throttle pressure to the primary regulator valve 23 exclusively used for regulating a hydraulic pressure $P_{23}$ in the normal line-pressure control. The control hydraulic pressure $P_{SLT}$ beyond the hydraulic-pressure range LTH (that is, the control hydraulic pressure $P_{SLT}$ having values in the margin control region or the second control region shown in FIGS. 5 and 6) is supplied to the B-4 control valve 21. The high control hydraulic pressure $P_{SLT}$ in the margin control region also causes the line pressure $P_{23}$ to increase to a value greater than those used in the normal line-pressure control. However, since the other hydraulic servos are not in the process of engaging or disengaging operation, no problems are caused by such a high line pressure $P_{23}$.

Accordingly, since the control hydraulic pressure $P_{SLT}$ generated by the second linear solenoid valve SLT is in the first control region, the second regulated hydraulic pressure $P_{21}$ generated by the B-4 control valve 21 is zero, applying a hydraulic pressure of virtually zero to the input port 30a. At that time, a first regulated hydraulic pressure $P_{20}$ generated by the output port 20c of the shift-pressure control valve 20 is supplied to the hydraulic servo B-4 of the fourth brake B4 through the second (U2) shift valve 29 and the other input port 30b of the B-4 bi-directional check valve 30. Shifting to the third ratio at that time, the fourth brake B4 which serves as a band brake is halted in the self-tightening direction A and has an engaging force sensitive to variations in hydraulic pressure arising in the hydraulic servo B-4 of the fourth brake B4 because the engaging force is generated by the self-servo power. As described above, however, the shift-pressure control valve (the first pressure regulating valve) 20 generates a first regulated hydraulic pressure $P_{20}$ substantially over the entire control hydraulic pressure range of the first linear solenoid valve SLS, allowing a very accurately regulated hydraulic pressure to be supplied to the hydraulic servo B-4, strictly speaking, to the brake engaging hydraulic chamber 42. Thus, the hydraulic pressure in the brake engaging hydraulic chamber 42 smoothly increases with the control hydraulic pressure $P_{SLS}$ generated by the first linear solenoid valve SLS as shown in the 2→3 shift region (region to the right of the 2→3 start line) on the left side of FIG. 5. As a result, in spite of the fact that the engaging force is sensitive to variations in hydraulic pressure in the self-tightening direction A, the fourth brake (band brake) B4 is engaged smoothly, shifting to the third ratio with reduced shift shock.

In a shift from the third ratio to the second ratio, a first regulated hydraulic pressure $P_{20}$ originally generated from the shift pressure control valve 20 is supplied to the brake engaging hydraulic chamber 42 of the hydraulic servo B-4 of the fourth brake B4 as is the case with the shift from the second ratio to the third ratio described above. As the control hydraulic pressure $P_{SLS}$ generated by the first linear solenoid valve SLS decreases as shown in FIG. 5, the first regulated hydraulic pressure $P_{20}$ supplied to the brake engaging hydraulic chamber 42 of the hydraulic servo B-4, is also reduced smoothly, releasing the fourth brake B4 gradually. Then, with the fourth brake B4 completely disengaged, the solenoid valve So2 is turned off, switching over the first (U1) shift valve 27 to a position as shown on the left-half side. In this state, the brake engaging hydraulic chamber 42 of the hydraulic servo B-4 is drained.

It should be noted that, in the shifts from the second ratio to the third ratio and from the third back to the second, a first regulated hydraulic pressure $P_{20}$ originally generated from the shift-pressure control valve 20 is supplied to the brake engaging hydraulic chamber 42 of the hydraulic servo B-4 for the fourth brake B4 and the control hydraulic pressure $P_{SLT}$ generated by the second linear solenoid valve SLT is in the first control region. The control hydraulic pressure $P_{SLT}$ is output for use in the line-pressure control. The B-4 control valve 21 is set so that, in the first control region of the control hydraulic pressure $P_{SLT}$, the second regulated hydraulic pressure $P_{21}$ output thereby is zero as shown in FIG. 7. As a result, in this first control region, the B-4 control valve 21 does not have an effect on the control of the hydraulic pressure supplied to the hydraulic servo B-4 of the fourth brake B4, which control is based on the first regulated hydraulic pressure $P_{20}$ generated by the shift-pressure control valve 20 and could otherwise be affected by a non-zero value of the second regulated hydraulic pressure $P_{21}$.

In a shift from the third ratio to the fourth ratio, the fourth back to the third and the fifth to the fourth low, the fourth brake B4 is switched over to a disengaged or engaged state and, at the same time, the third (UD direct) clutch C3 is also switched over to a disengaged or engaged state by control in a clutch-to-clutch transmission-ratio shift.

First of all, the shift from the third ratio to the fourth ratio will be explained. At the third ratio, the solenoid valves So1 and So2 are both turned on and a first regulated hydraulic pressure $P_{20}$ controlled by the linear solenoid valve SLS is supplied to the hydraulic servo B-4 of the fourth brake (band brake) B4 as described earlier. Upon issuance of a signal for starting a shift from the third ratio to the fourth ratio as shown in FIG. 5, a command is transmitted to the second linear solenoid valve SLT to generate a control hydraulic pressure $P_{SLT}$ beyond the normal line-pressure control range LTH, that is, a control hydraulic pressure $P_{SLT}$ in the second control region shown in FIG. 5. The control hydraulic pressure $P_{SLT}$ is supplied to the B-4 control valve 21. Receiving the control hydraulic pressure $P_{SLT}$, the B-4 control valve 21 generates a relatively high second regulated hydraulic pressure $P_{21}$ from its output port 21c in accordance with the large control gain thereof. The second regulated hydraulic pressure $P_{21}$ controlled by the second (throttle-pressure-control) linear solenoid valve SLT is supplied to the input port 30a of the B-4 bi-directional check valve 30 through the ports 27e and 27c of the first (U1) shift valve 27.

Subsequently, the solenoid valve So1 is turned off. A hydraulic pressure rising on a hydraulic path (h) is supplied to a control hydraulic chamber 29c of the second (U2) shift valve 29, switching over the valve 29 to a position as shown on the right-half side. In this state, the hydraulic path between the ports 29a and 29b is cut. On the other hand, a hydraulic path is opened from the port 29a to a port 29d to which a line pressure is supplied from the port 26b of the manual valve 26 through a hydraulic path (i), retaining the first (U1) shift valve 27 at the position as shown on the right-half side.

In this state, the first regulated hydraulic pressure $P_{20}$ generated by the shift-pressure control valve 20 in accordance with the control hydraulic pressure $P_{SLS}$ generated by the first linear solenoid valve SLS is supplied to the hydraulic servo C-3 of the third (UD direct) clutch C3 through the ports 27b and 27d of the first (U1) shift valve 27 and the ports 29e and 29f of the second (U2) shift valve 29. On the other hand, the second regulated hydraulic pressure $P_{21}$ generated by the B-4 control valve 21 in accordance with the control hydraulic pressure $P_{SLT}$ generated by the second (throttle-pressure-control) linear solenoid valve SLT is supplied to the brake engaging hydraulic chamber 42 of the hydraulic servo B-4 of the fourth brake (band brake) B4 through the input port 30a of the B-4 bi-directional check valve 30 because the first (U1) shift valve 27 is retained at a position on the right-half side.

It should be noted that, at the third ratio, the first regulated hydraulic pressure $P_{20}$ generated by the shift-pressure control valve 20 is supplied to the hydraulic servo B-4 of the fourth brake B4 through the ports 27b and 27d of the first (U1) shift valve 27, the ports 29e and 29f of the second (U2) shift valve 29 and the input port 30b of the B-4 bi-directional check valve 30. When the solenoid valve So1 is turned off, however, the second (U2) shift valve 29 is switched over to a position on the right-half side, cutting off the supply of hydraulic pressure from the first pressure regulating valve 20 to the input port 30b. As described earlier, none the less, since the second regulated hydraulic pressure $P_{21}$ generated by the B-4 control valve 21 is supplied to the input port 30a of the B-4 bi-directional check valve 30, a hydraulic pressure is supplied to the hydraulic servo B-4 without delay, avoiding a low-pressure state.

Then, in a shift from the third ratio to the fourth ratio, the fourth brake or brake band B4 is disengaged with the brake drum being driven in the self-loosening direction B by the engagement forces of the clutch C3. In this case, unlike the self-tightening direction A, the self-servo power does not exist as described earlier. As a result, the engaging force is not sensitive to variations in hydraulic pressure. Thus, by decreasing the control hydraulic pressure $P_{SLT}$ generated by the second linear solenoid valve SLT in the margin control region (the second control region) of the second (throttle-pressure-control) linear solenoid valve SLT shown in FIG. 5, the hydraulic pressure in the hydraulic servo B-4 gradually decreases. As a result, in spite of the fact that the regulated hydraulic pressure controlled by the second regulated hydraulic pressure $P_{21}$ generated by the B-4 control valve 21 having a large control gain is of a relatively low degree of accuracy, the fourth brake B4 is disengaged smoothly in the self-loosening direction B.

In the case of the third (UD direct) clutch C3, a wet multi-plate clutch requiring control with a high degree of accuracy, on the other hand, the shift-pressure control valve 20 generates the highly accurate first regulated hydraulic pressure $P_{20}$ with a relatively small control gain in accordance with the control hydraulic pressure $P_{SLS}$ generated by the first linear solenoid valve SLS substantially over the entire control region. The regulated hydraulic pressure $P_{20}$ is supplied to the hydraulic servo C-3 of the third (UD direct) clutch C3 as a regulated hydraulic pressure specially used for regulating the hydraulic pressure of the third (UD direct) clutch C3. By smoothly increasing the pressure in the control hydraulic chamber of the first linear solenoid valve SLS, the hydraulic pressure in the hydraulic servo C-3 also increases, engaging the third (UD direct) clutch C3 smoothly. Then, as the third (UD direct) clutch C-3 is engaged completely, the solenoid valve So2 is switched over to a turned-off state.

In the shift from the fourth ratio to the third ratio (FIG. 5) and from the fifth ratio to the fourth low ratio (FIG. 6), the solenoid valve So1 is in a turned-off state at the beginning of the shifts. As described above, the highly accurate first regulated hydraulic pressure $P_{20}$ generated in accordance with the control hydraulic pressure $P_{SLS}$ of the first linear solenoid valve SLS is supplied to the hydraulic servo C-3 of the third (UD direct) clutch C3, engaging the third (UD direct) clutch C3. Since the control hydraulic pressure $P_{SLT}$ generated by the second linear solenoid valve SLT is in the first control region shown in FIG. 5, the second regulated hydraulic pressure $P_{21}$ supplied to the hydraulic servo B-4 of the fourth brake B4 is virtually zero with the fourth brake B4 being disengaged. In this state, by sweeping down the control hydraulic pressure $P_{SLS}$ generated by the first linear solenoid valve SLS, the hydraulic pressure in the hydraulic servo C-3 of the third (UD direct) clutch C3 decreases gradually, disengaging the third (UD direct) clutch C3 smoothly. In addition, the second solenoid valve SLT generates the control hydraulic pressure $P_{SLT}$ of a substantially fixed value in the second control region slightly beyond the first control region shown in FIG. 5. With the hydraulic pressure $P_{SLT}$ having such a magnitude, the hydraulic servo B-4 of the fourth brake B4 puts a drum 33 rotating in the self-loosening direction B in a state immediately before the engaged or halted state. As the torque transmitted through the third (UD direct) clutch C3 becomes approximately zero, the control hydraulic pressure $P_{SLT}$ generated by the second (throttle-pressure-control) linear solenoid valve SLT is increased in the second control region, causing the hydraulic pressure in the hydraulic servo B-4 of the fourth brake B4 to rise. As a result, the engaging force of the fourth brake B4 increases.

At that time, the engaging force of the fourth brake B4 operating in the self-loosening direction B is not sensitive to variations in hydraulic pressure. As a result, the second regulated hydraulic pressure $P_{21}$ generated by the B-4 control valve 21 with a large control gain and a low degree of accuracy in accordance with the control hydraulic pressure $P_{SLT}$ generated by the second linear solenoid valve SLT in the margin control region (the second control region cited earlier) can also be used for controlling the hydraulic pressure of the fourth brake B4 without problems. In the mean time, the third (UD direct) clutch C3 is controlled to enter a disengaged state smoothly by means of the shift-pressure control valve 20 with a small control gain and with a high degree of accuracy in accordance with the control hydraulic pressure $P_{SLS}$ generated by the first linear solenoid valve SLS over the entire control region.

As the fourth brake B4 is engaged completely, the solenoid valve So1 is switched over to a turned-on state, switching over the second (U2) shift valve 29 to a position on the left-half side. At this position, a port 29f is drained, disengaging the hydraulic-pressure servo of the third (UD direct) clutch C3. It should be noted that the hydraulic path between the ports 29b and 29d is cut due to the switching-over of the second (U2) shift valve 29 to a position as shown on the left-half side. Nevertheless, since the solenoid valve So2 is turned on, causing a line pressure on a hydraulic path (g) to rise, a hydraulic pressure is supplied to the control hydraulic chamber 27a of the first (U1) shift valve 27 through the ports 29a and 29b of the second (U2) shift valve 29, retaining the first (U1) shift valve at the position as shown on the right-half side. As a result, at the third and fourth low ratios wherein the solenoid valve So1 is turned on, the first regulated hydraulic pressure $P_{20}$ generated by the shift-pressure control valve 20 in accordance with the control hydraulic pressure $P_{SLS}$ generated by the first linear solenoid valve SLS is supplied to the hydraulic servo B-4 of the fourth brake (band brake) B4 through the ports 27d and 27b of the first (U1) shift valve 27, the ports 29e and 29g of the second (U2) shift valve 29 and the port 30b of the B-4 bi-directional check valve 30.

At the first ratio, the first (U1) shift valve 27 is switched over to a position as shown on the left-half side. At a low ratio, the line pressure controlled by the second (throttle-pressure-control) solenoid valve SLT needs to be set at a high value. For this reason, the control hydraulic pressure $P_{SLT}$ generated by the second linear solenoid valve SLT is set at a value at the high end of the first control region close to the second control region. As a result, when the control hydraulic pressure $P_{SLT}$ rises to a value in the second control region for some reason, causing the second regulated hydraulic pressure $P_{21}$ to be generated by the B-4 control valve 21, the control of the hydraulic pressure in the hydraulic servo B-4 for the fourth brake B4 might be affected. As described earlier, however, at the first ratio, the port 27e of the first (U1) shift valve 27 is closed and, at the same time, the port 27c thereof is drained, so that the second regulated hydraulic pressure $P_{21}$ generated by the B-4 control valve 21 is reliably prevented from being supplied to the hydraulic servo B-4 of the fourth brake B4.

According to the embodiment described above, at the third and the fourth low ratios, the band brake is engaged. It should be noted, however, that the scope of the present invention is not limited to the aforementioned embodiment. It is needless to say that the present invention can also be supplied as well to a case in which the band brake is engaged at other ratios. In addition, in place of the linear solenoid valves which serve as pressure regulating valves, other means such as controlled-duty solenoid valves can also be used as well. In addition, in place of the throttle-pressure-control linear solenoid valve which serves as a dual-purpose valve, another pressure regulating means such as a linear solenoid valve for a lock-up clutch can also be used as well.

What is claimed is:

1. A control apparatus for an automatic transmission comprising
    a transmission mechanism having a plurality of friction engagement elements including a first friction engagement element with a band brake and a first hydraulic servo and including a second friction engagement element with a second hydraulic servo, and a control for accomplishing a first transmission-ratio shift through a clutch-to-clutch transmission-ratio shift of said first and second friction engagement elements and for accomplishing a second transmission-ratio shift different from said first transmission-ratio shift by engaging or disengaging said first friction engagement element; said control comprising:
        a first solenoid valve for generating a first control hydraulic pressure exclusively for regulating a first hydraulic pressure to be supplied to said hydraulic servos of said friction engagement elements;
        a second solenoid valve for generating a second control hydraulic pressure in a first control region for carrying out control other than regulating said first hydraulic pressure to be supplied to said hydraulic servos of said friction engagement elements and, in addition, in a second control region virtually different from said first control region for regulating a second hydraulic pressure;
        a first pressure regulating valve for generating said first regulated hydraulic pressure with a relatively small control gain in accordance with said first control hydraulic pressure generated by said first solenoid valve;
        a second pressure regulating valve for generating said second regulated hydraulic pressure with a relatively large control gain in accordance with said second control hydraulic pressure generated by said second solenoid valve in said second control region; and
        switching means for selectively passing on either said first regulated hydraulic pressure generated by said first pressure regulating valve or said second regulated hydraulic pressure generated by said second pressure regulating valve to either a hydraulic servo of said first friction engagement element or a hydraulic servo of said second friction engagement element;
        said first friction engagement element being used in a self-loosening direction in said first transmission-ratio shift and in a self-tightening direction in said second transmission-ratio shift;
        said switching means, in said first transmission-ratio shift, passing on said first regulated hydraulic pressure generated by said first pressure regulating valve to said second hydraulic servo of said second friction engagement element and said second regulated hydraulic pressure generated by said second pressure regulating valve to said first hydraulic servo of said first friction engagement element; and
        said switching means, in said second transmission-ratio shift, passing on said first regulated hydraulic pressure generated by said first pressure regulating valve to said first hydraulic servo of said first friction engagement element.

2. A control apparatus of an automatic transmission according to claim 1 wherein said second control hydraulic pressure generated by said second solenoid valve in said first control region is a throttle pressure which represents a throttle opening and is supplied to a primary regulator valve for controlling a line pressure.

3. A control apparatus of an automatic transmission according to claim 1 wherein said switching means comprises
    a first shift valve for selectively connecting a hydraulic path from said first pressure regulating valve to either said first hydraulic servo of said first friction engagement element or said second hydraulic servo of said second friction engagement element; and
    a bi-directional check valve for passing on the highest among said first regulated hydraulic pressure supplied by said first pressure regulating valve through said first shift valve and said second regulated hydraulic pressure supplied by said second pressure regulating valve to said first hydraulic servo of said first friction engagement element;
    said second pressure regulating valve generating said second regulated hydraulic pressure only when said second solenoid valve generates said second control hydraulic pressure in said second control region.

4. A control apparatus of an automatic transmission according to claim 3 wherein:
   said first transmission-ratio shift is a shift from a high-speed ratio to a medium-speed ratio and said second transmission-ratio shift is a shift from said medium-speed ratio to a low-speed ratio;
   said switching means further includes a second shift valve to be actuated in a shift from said low-speed ratio to a very-low-speed ratio; and
   said second shift valve, at said very low ratio, cuts a hydraulic path between said second pressure regulating valve and said bi-directional check valve.

5. A control apparatus of an automatic transmission according to claim 2 wherein said switching means comprises
   a first shift valve for selectively connecting a hydraulic path from said first pressure regulating valve to either said first hydraulic servo of said first friction engagement element or said second hydraulic servo of said second friction engagement element, and
   a bi-directional check valve for passing on the highest among said first regulated hydraulic pressure supplied by said first pressure regulating valve through said first shift valve and said second regulated hydraulic pressure supplied by said second pressure regulating valve to said first hydraulic servo of said first friction engagement element;
   said second pressure regulating valve generating said second regulated hydraulic pressure only when said second solenoid valve generates said second control hydraulic pressure in said second control region.

6. A control apparatus of an automatic transmission according to claim 5 wherein:
   said first transmission-ratio shift is a shift from a high-speed ratio to a medium-speed ratio and said second transmission-ratio shift is a shift from said medium-speed ratio to a low-speed ratio;
   said switching means further includes a second shift valve to be actuated in a shift from said low-speed ratio to a very-low-speed ratio; and
   said second shift valve, at said very low ratio, cuts a hydraulic path between said second pressure regulating valve and said bi-directional check valve.

* * * * *